(12) United States Patent
Piotrowski (10) Patent No.: US 7,594,672 B2
(45) Date of Patent: Sep. 29, 2009

(54) AUTOMATED RUNNING BOARD CRANK DRIVE

(75) Inventor: Zygmunt Piotrowski, Woodbridge (CA)

(73) Assignee: Magna International Inc, Aurora Ontario (CA)

( * ) Notice: Subject to any disclaimer, the term of this patent is extended or adjusted under 35 U.S.C. 154(b) by 250 days.

(21) Appl. No.: 11/601,004

(22) Filed: Nov. 17, 2006

(65) Prior Publication Data
US 2008/0116653 A1    May 22, 2008

(51) Int. Cl.
*B60R 3/02* (2006.01)
(52) U.S. Cl. .................................. 280/166; 280/163
(58) Field of Classification Search ............ 280/166, 280/164.2, 163, 164.1, 169
See application file for complete search history.

(56) References Cited

U.S. PATENT DOCUMENTS

| | | | | |
|---|---|---|---|---|
| 3,762,742 A | * | 10/1973 | Bucklen | 280/166 |
| 4,073,502 A | * | 2/1978 | Frank et al. | 280/166 |
| 4,110,673 A | * | 8/1978 | Magy et al. | 280/166 |
| 4,116,457 A | * | 9/1978 | Nerem et al. | 280/166 |
| 4,982,974 A | * | 1/1991 | Guidry | 280/164.2 |
| 5,697,626 A | | 12/1997 | McDaniel et al. | |
| 5,842,709 A | * | 12/1998 | Maccabee | 280/166 |
| 6,325,397 B1 | * | 12/2001 | Pascoe et al. | 280/166 |
| 6,375,207 B1 | * | 4/2002 | Dean et al. | 280/166 |
| 6,641,158 B2 | * | 11/2003 | Leitner | 280/166 |
| 6,746,033 B1 | | 6/2004 | McDaniel | |
| 7,118,120 B2 | | 10/2006 | Lee et al. | |
| 7,287,771 B2 | * | 10/2007 | Lee et al. | 280/166 |
| 7,367,574 B2 | * | 5/2008 | Leitner | 280/166 |
| 7,377,531 B2 | * | 5/2008 | Fabiano et al. | 280/163 |
| 7,413,204 B2 | * | 8/2008 | Leitner | 280/163 |
| 2005/0280242 A1 | | 12/2005 | Fabiano et al. | |

OTHER PUBLICATIONS

International Search Report For PCT/CA2007/002056 Dated Mar. 20, 2008.

* cited by examiner

*Primary Examiner*—Hau V Phan
(74) *Attorney, Agent, or Firm*—Clark Hill PLC (57) ABSTRACT

A running board assembly for a motor vehicle includes a mounting bracket adapted to be fixedly secured to the motor vehicle. The running board assembly includes first and second links each having an upper end pivotal relative to the mounting bracket and an opposing lower end. A deck is pivotally coupled to the lower end of the first and second links for movement between a stowed position and a deployed position. A motor assembly is coupled to the mounting bracket. And a crank drive is operably connected to the motor assembly for pivoting the first and second links to provide controlled movement of the deck between the stowed and deployed positions.

7 Claims, 10 Drawing Sheets

AUTOMATED RUNNING BOARD CRANK DRIVE

BACKGROUND OF THE INVENTION

1. Field of the Invention

The invention relates to a running board assembly for a motor vehicle. More particularly, the invention relates to a running board assembly including a crank for providing smooth, controlled movement of a deck between a stowed position and a deployed position.

2. Description of Related Art

Running boards are well-known for assisting individuals in entering and exiting motor vehicles having a high ground clearance. Retractable running boards include a platform or step that is movable between a stowed position, in which the platform is tucked underneath a motor vehicle body panel, and a deployed position, in which the platform is spaced apart from the motor vehicle body panel for supporting an individual. Typically, a four bar linkage is utilized to effectuate movement of the platform between the retracted and extended positions. The four bar linkage includes a mounting bracket adapted to be fixedly secured to the motor vehicle body panel, a link fixedly secured to the platform, and a pair of arms pivotally interconnected between the mounting bracket and the link. A motor may be utilized to provide automated movement of the platform between the stowed and deployed positions. It is, however, difficult to control the speed in such automated running boards, particularly at the end of travel. In addition, a high amount of motor torque is required to move the platform out of the deployed position and towards the stowed position.

SUMMARY OF THE INVENTION

According to one aspect of the invention, a running board assembly for a motor vehicle includes a mounting bracket adapted to be fixedly secured to the motor vehicle. The running board assembly includes first and second links each having an upper end pivotal relative to the mounting bracket and an opposing lower end. A deck is pivotally coupled to the lower end of the first and second links for movement between a stowed position and a deployed position. A motor assembly is coupled to the mounting bracket. And a crank drive is operably connected to the motor assembly for pivoting the first and second links to provide controlled movement of the deck between the stowed and deployed positions.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE PREFERRED EMBODIMENTS

Figure 1:
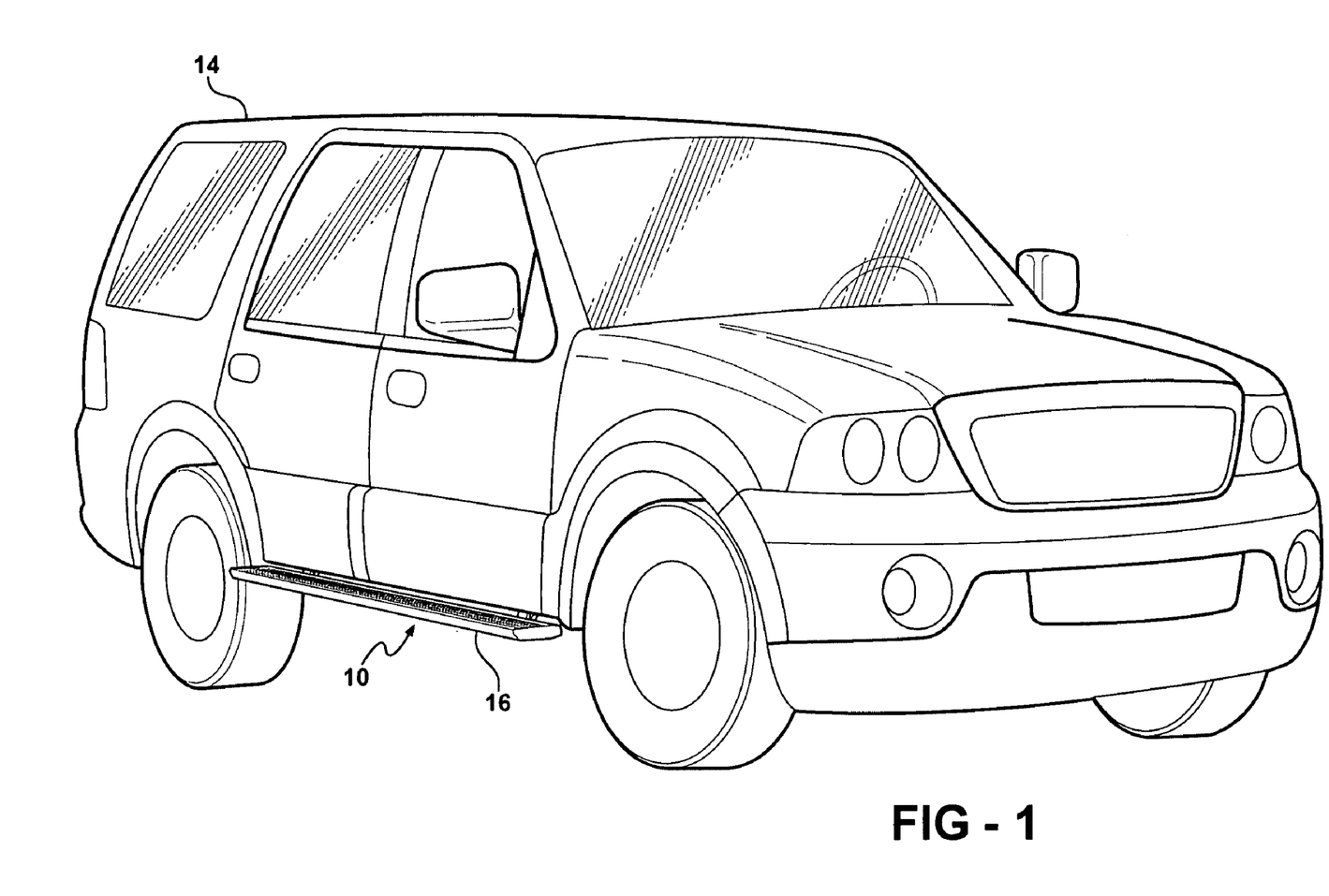
FIG. 1 is a perspective view of a motor vehicle including a running board assembly according to the invention.
Figure 2:
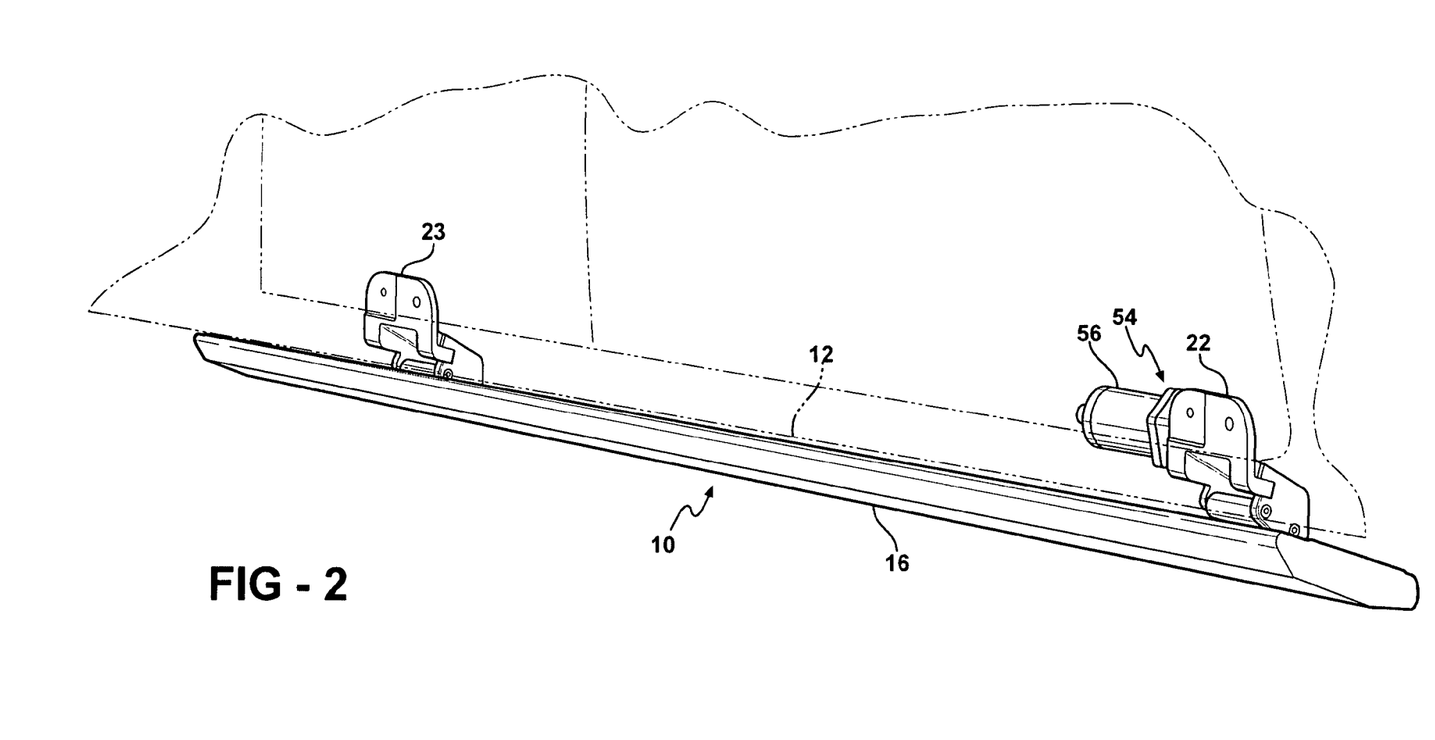
FIG. 2 is a perspective view of the running board assembly including a deck in a stowed position.
Figure 3:
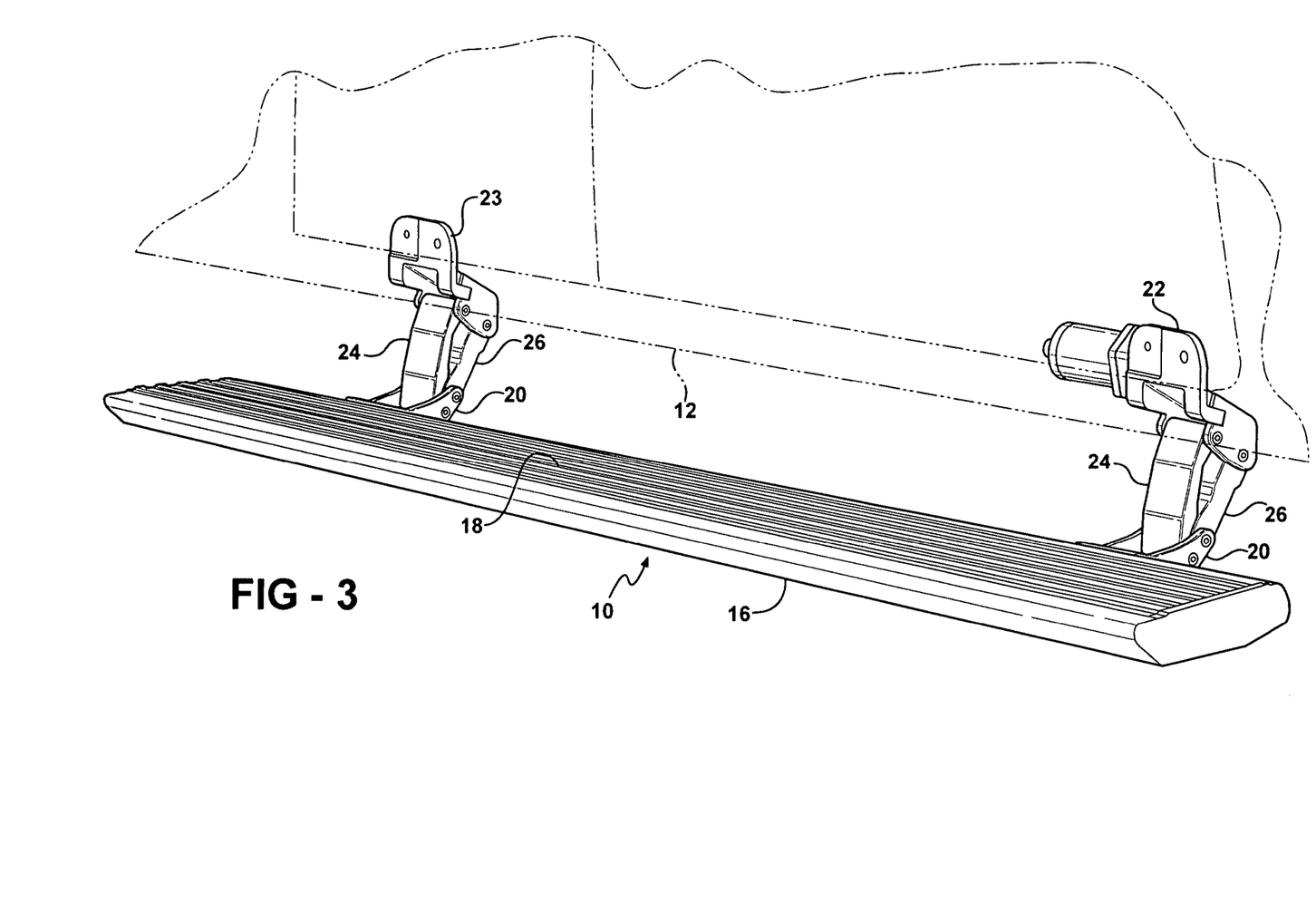
FIG. 3 is a perspective view of the running board assembly including the deck in a deployed position.

Referring to FIGS. 1 through 3, a running board assembly, generally shown at 10, is provided along an underbody 12 of a motor vehicle 14. The running board assembly 10 includes a deck or step 16 extending longitudinally alongside the motor vehicle 14. The deck 16 includes a stepping surface 18. The deck 16 is movable between a stowed position, shown in FIG. 2, in which the stepping surface 18 is largely hidden from view and a deployed position, shown in FIG. 3, in which the stepping surface 18 is spaced away from the underbody 12 and available to support individuals entering and exiting the motor vehicle 14. The deck 16 includes at least one arm 20 extending out therefrom.

The running board assembly 10 also includes a pair of spaced apart mounting brackets 22, 23 adapted to be fixedly secured to the underbody 12 of the motor vehicle 14. It is contemplated that the number of mounting brackets utilized in the running board assembly 10 may vary. First 24 and second 26 links are pivotally movable relative to each mounting bracket 22, 23. The first link 24 is located outboard of the second link 26.

Figure 4:
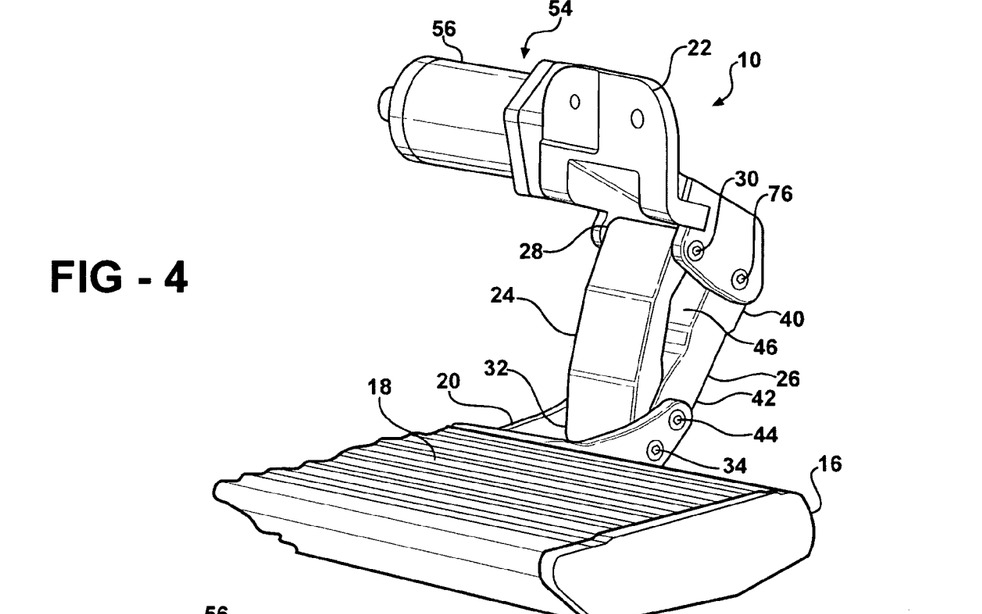
FIG. 4 is a fragmentary perspective view of the running board assembly including first and second links for moving the deck between the stowed and deployed positions.
Figure 5:
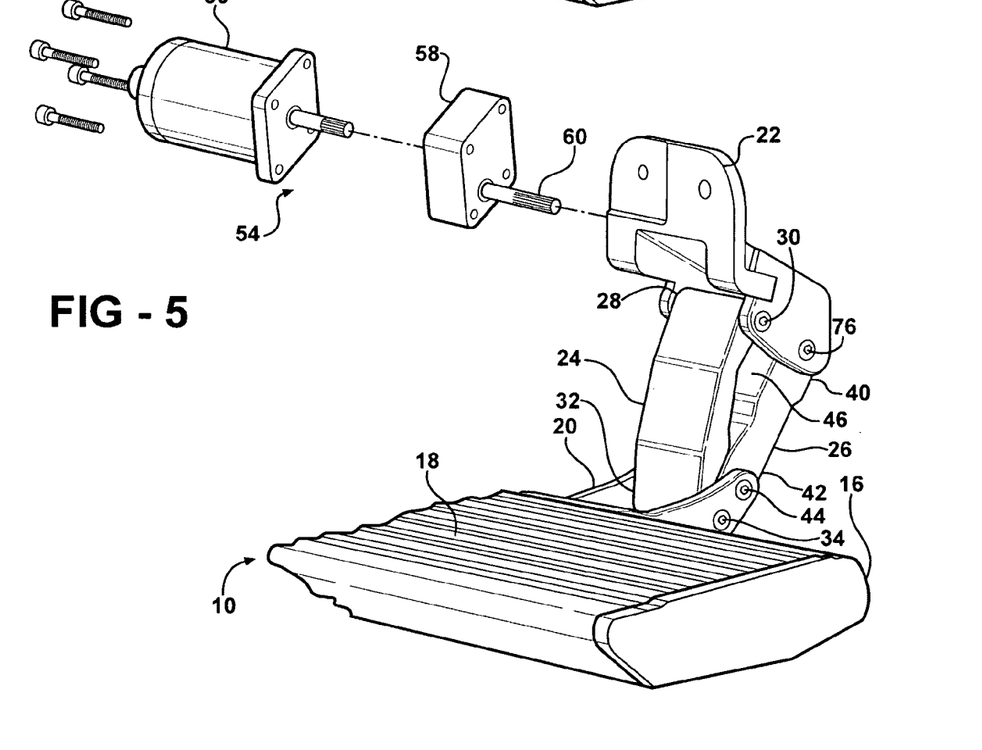
FIG. 5 is a fragmentary perspective view of the running board assembly including the motor assembly exploded out therefrom.
Figure 6:
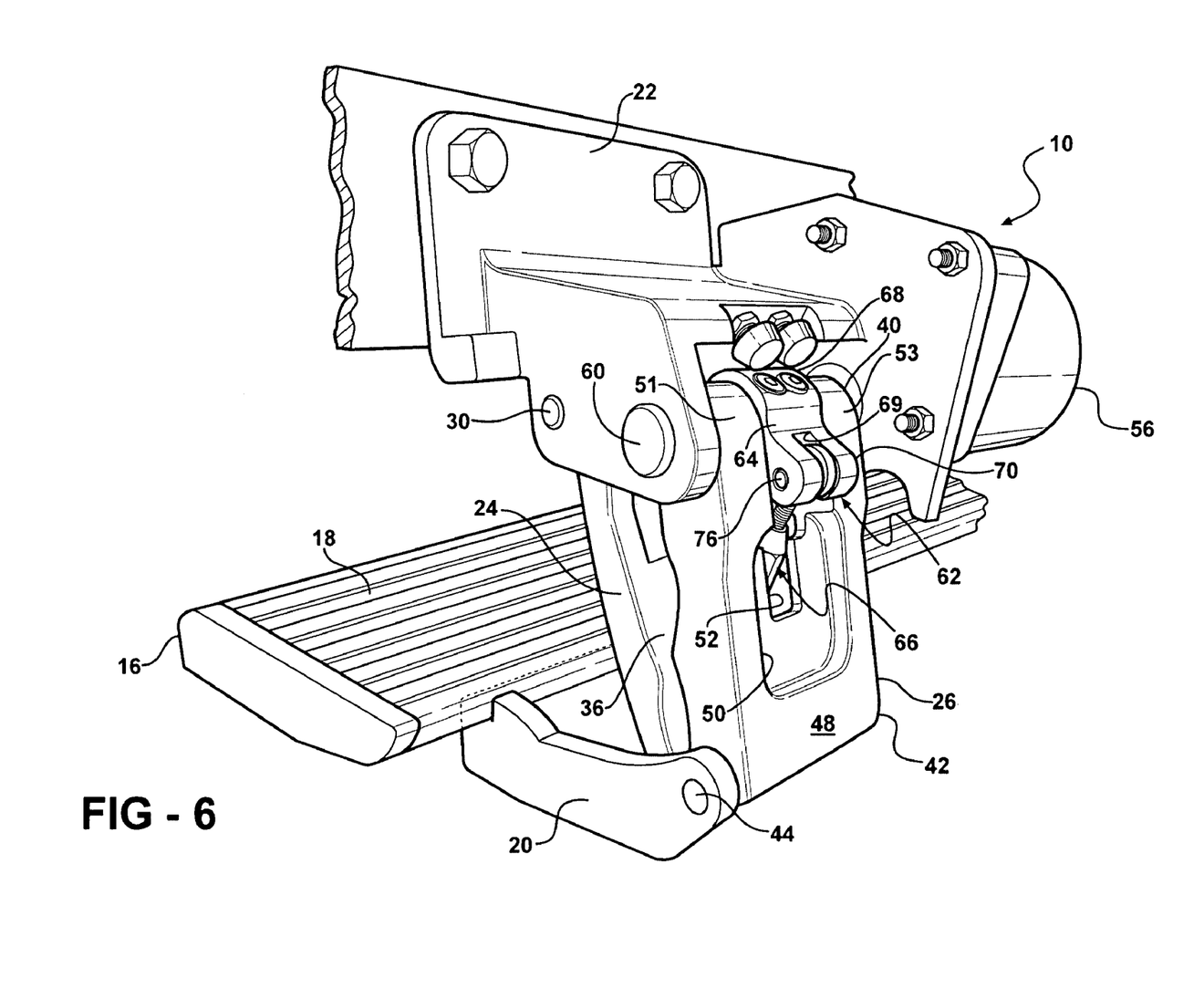
FIG. 6 is a fragmentary perspective view of the running board assembly including a crank disposed within a cutout formed in the second link.

Referring to FIGS. 4 through 6, the first link 24 includes an upper end 28 pivotally coupled to the mounting bracket 22 about a pin 30 and an opposing lower end 32 pivotally coupled to the arm 20 about a pin 34. The first link 24 includes an inner surface 36 facing the second link 26. The inner surface 36 defines a pocket 38 (shown in FIG. 8) formed in the first link 24. It is appreciated that the particular shape and size of the pocket 38 may vary.

The second link 26 includes an upper end 40 and an opposing lower end 42 each pivotally movable relative to the mounting bracket 22. The lower end 42 is pivotally coupled to the arm 20 about a pin 44. The second link 26 includes an outboard surface 46 and an opposing inboard surface 48. The outboard surface 46 faces the inner surface 36 of the first link 24. A cutout 50 is formed along the inboard surface 48 of the second link 24. In addition, the second link 26 defines an opening 52 extending from the inboard surface 48 through the outboard surface 46. The opening 52 divides the upper end 40 of the first link 24 into spaced apart arms 51, 53.

A motor assembly, generally indicated at 54, is coupled to the mounting bracket 22. The motor assembly 54 includes a reversible motor 56, a reduction gear set 58, and a rotatable drive shaft 60. Activation of the reversible motor 56 causes rotation of the drive shaft 60 in one of two opposing directions. The spaced apart arms 51, 53 are fixedly mounted along the drive shaft 60.

Referring to FIGS. 6 through 9, a crank drive, generally shown at 62, provides controlled movement of the deck 16 between the stowed and deployed positions. The crank drive 62 includes a crank 64 and a lever 66. The crank 64 has an enlarged end 68 and an opposing distal end 70 defining a cavity 69. The enlarged end 68 is fixedly mounted along the drive shaft 60 such that rotational movement of the drive shaft 60 causes the crank 64 to rotate. More specifically, the enlarged end 68 includes an aperture 71 for receiving the drive shaft 60 therethrough. The crank 64 is disposed within the opening 52 formed in the second link 26 between the spaced apart arms 51, 53 thereof.

Figure 7:
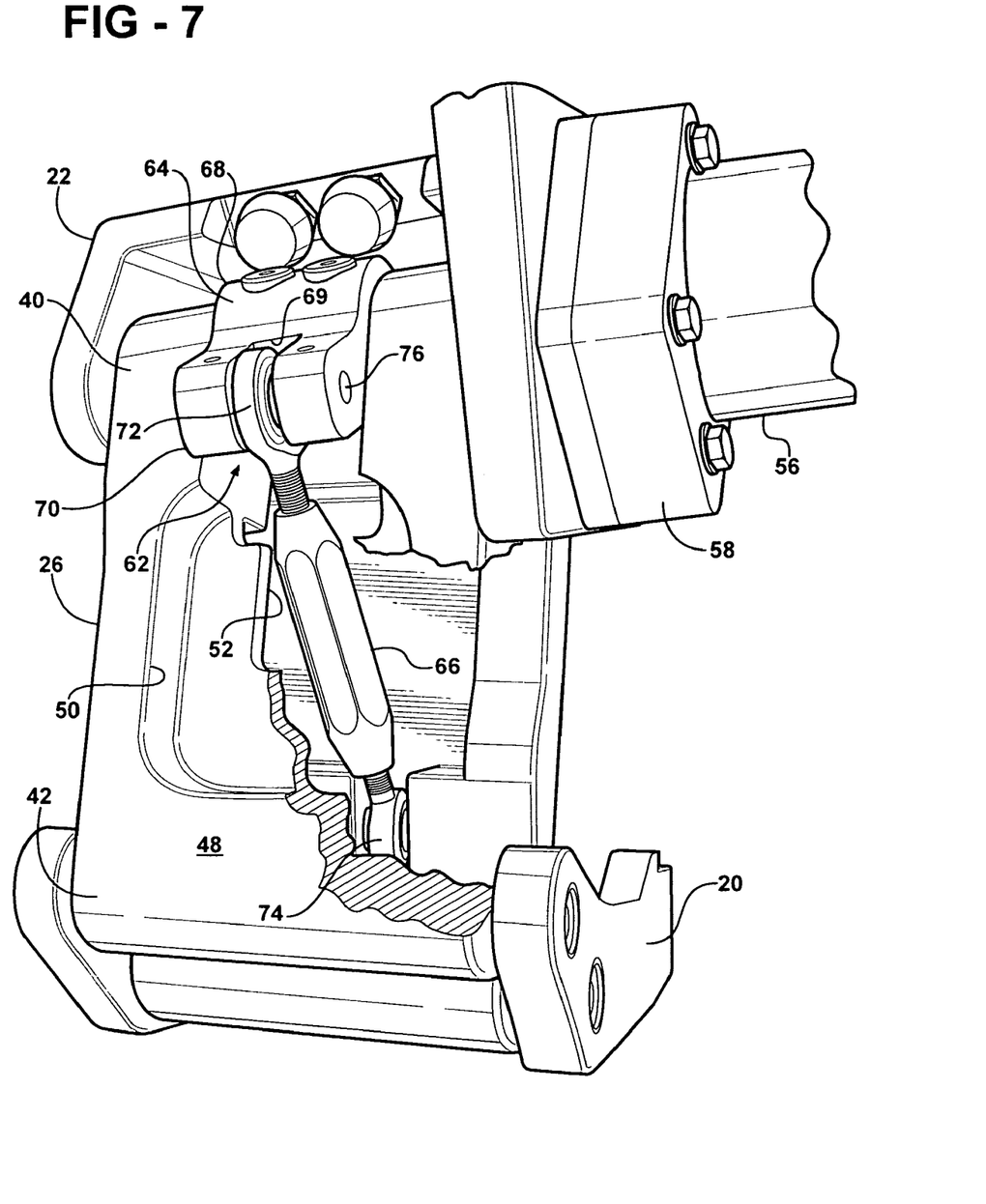
FIG. 7 is a fragmentary, rear perspective view of the running board assembly including a lever extending between the crank and the first link.
Figure 8:
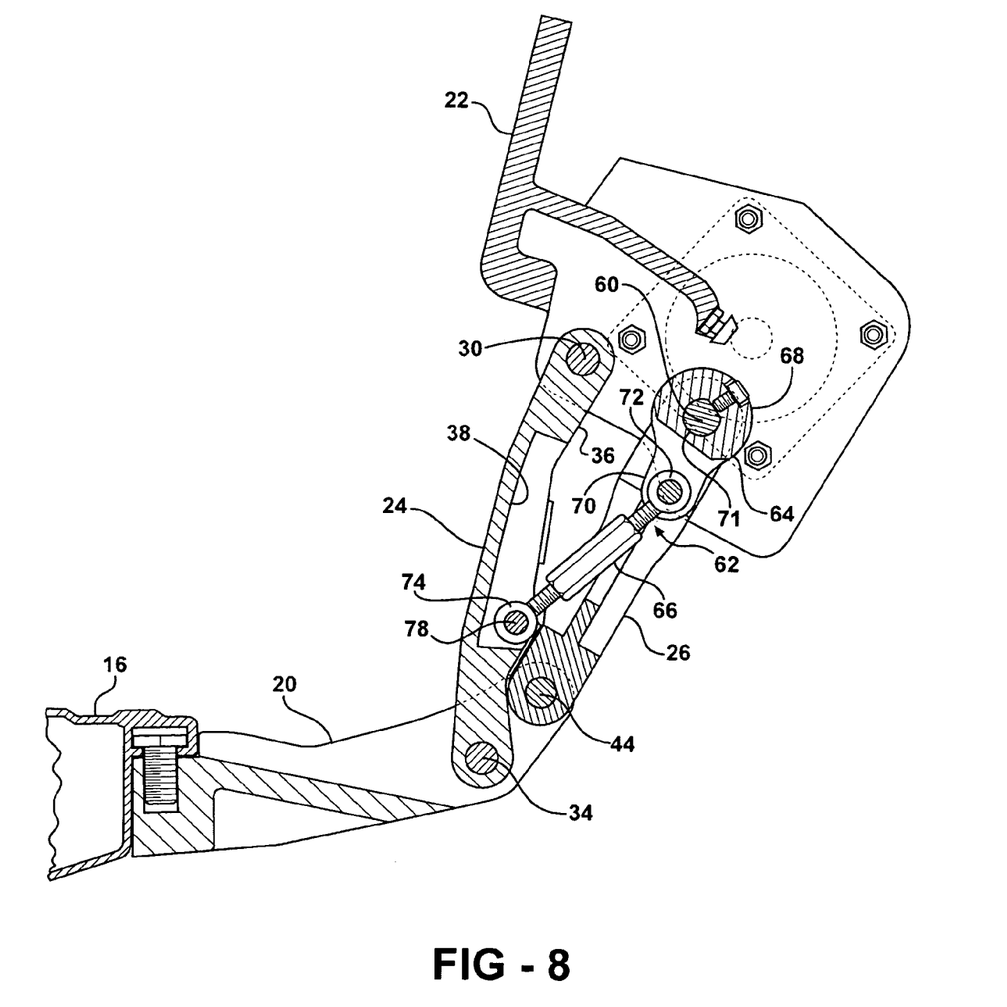
FIG. 8 is a sectional view of the running board assembly showing the relative locations of the lever and crank when the deck is in the deployed position.
Figure 9:
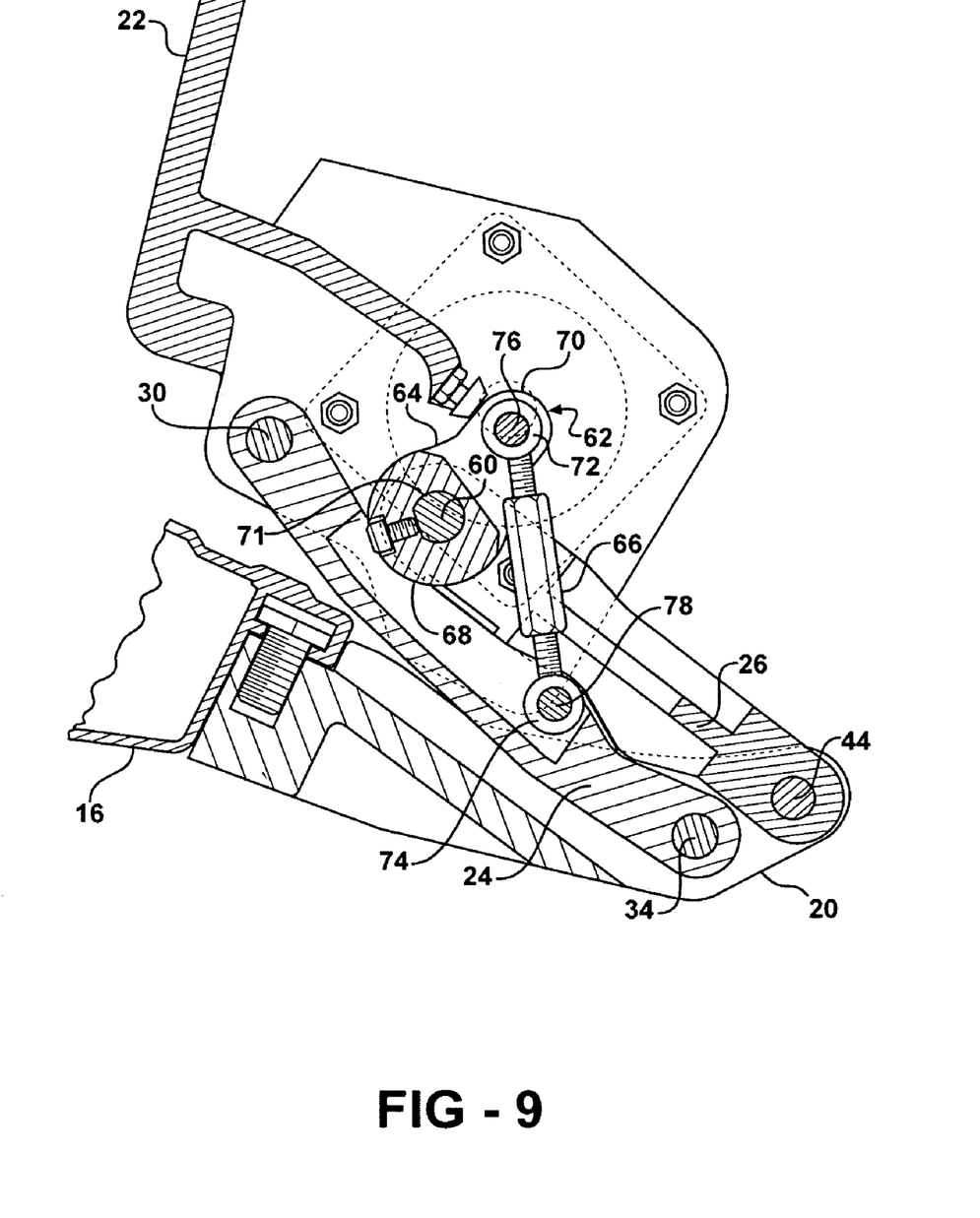
FIG. 9 is a sectional view of the running board assembly showing the relative locations of the lever and crank when the deck is in the stowed position.

The lever 66 includes one end 72 coupled to the distal end 70 of the crank 64 and an opposing end 74 coupled to the first link 24. The end 72 is disposed within the cavity 69 formed in the distal end 70 of the crank 64 in a ball joint-like arrangement. An axle 76 extends through the end 72 and the cavity 69 to pivotally couple the lever 66 and the crank 64 relative to one another. The opposing end 74 pivots about an axle 78 located within the pocket 38 of the first link 24. It is contemplated that the opposing end 74 may be coupled to the first link 24 at any of numerous locations.

In operation, starting with the deck 16 in the stowed position, as shown in FIG. 9, the motor 56 is activated to rotate the drive shaft 60 in a first direction. The crank 64 is fixedly mounted to the drive shaft 60 and as a result rotates in the first direction. The crank 64 translates the rotational movement of the drive shaft 60 into linear movement of the lever 66. The lever 66 is connected to the first link 24 and forces the first link 24 into pivotal movement. Thus, the crank drive 62 drives the first 24 and second 26 links to move the deck 16 into the deployed position, shown in FIG. 8. The crank 64 effectively slows down movement of the deck 16 as the deck 16 reaches the deployed position. As a result, movement of the deck 16 proceeds in a smooth and controlled manner.

To return the deck 16 to the stowed position, the motor 56 is activated to rotate the drive shaft 60 in an opposing second direction. The crank 64 is fixedly mounted to the drive shaft 60 and as a result rotates in the second direction. The crank 64 translates the rotational movement of the drive shaft 60 into linear movement of the lever 66. The lever 66 is connected to the first link 24 and forces pivotal movement thereof. Thus, the crank drive 62 drives the first 24 and second 26 links to move the deck 16 into the stowed position.

Figure 10:
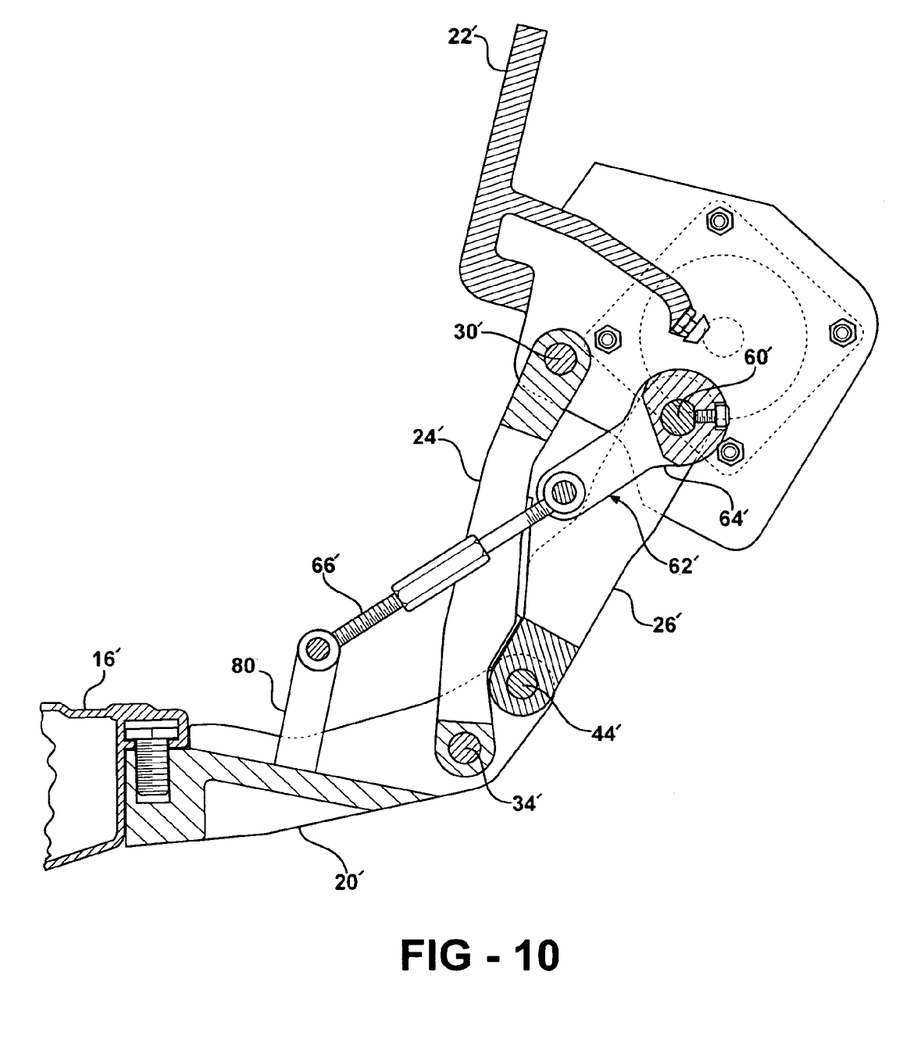
FIG. 10 is a sectional view of a running board assembly according to an alternative embodiment of the invention including a lever extending between a crank and a deck with the deck in a deployed position.
Figure 11:
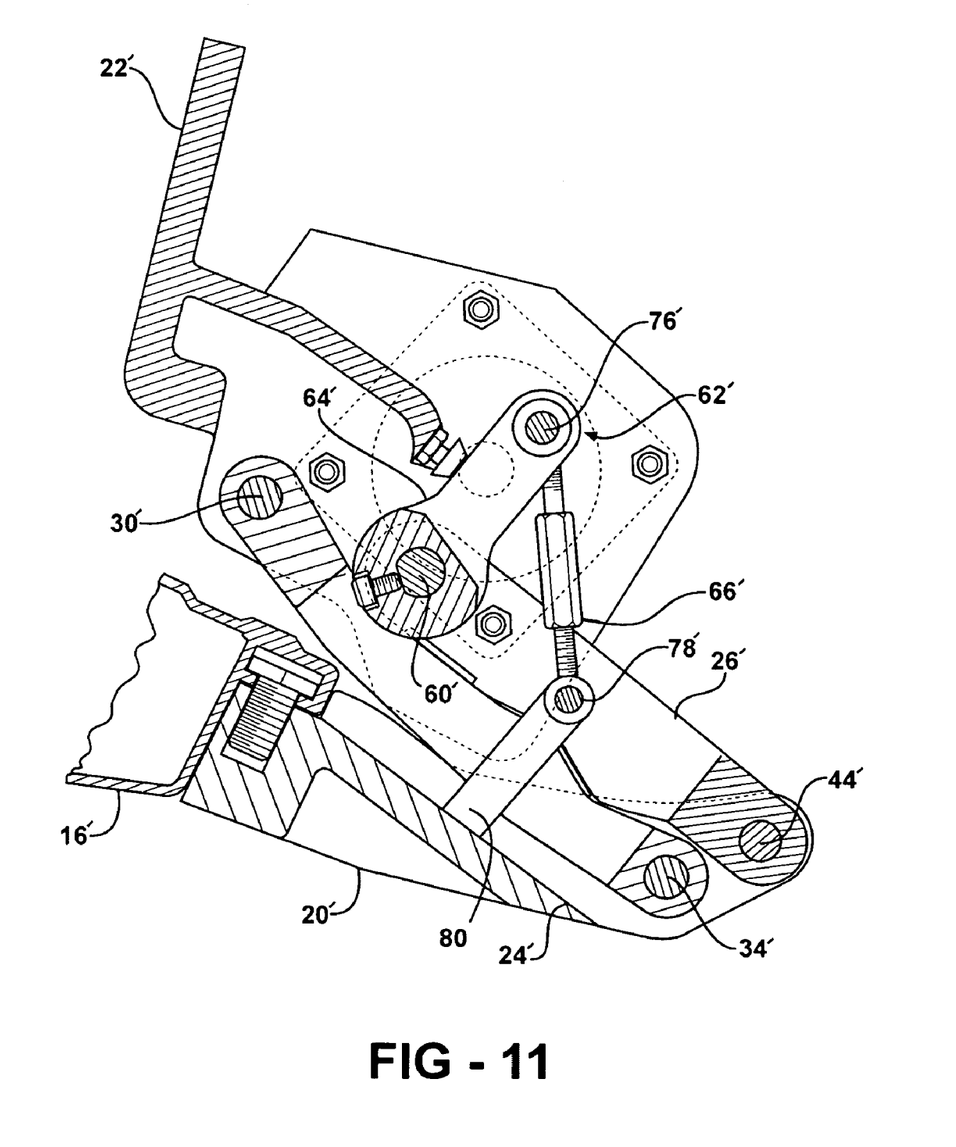
FIG. 11 is a sectional view of the running board assembly showing the relative locations of the lever and crank when the deck is in a stowed position.

Referring to FIGS. 10 and 11, wherein primed reference numerals represent similar elements as those set forth above, the running board assembly 10' according to a second embodiment of the invention includes the lever 66' extending between the crank 64' and the deck 16'. More specifically, the deck 16' includes a projection 80 extending out from the arm 20' for coupling to the lever 66'. Although the lever 66' is shown and described as being coupled to the projection 80, it is appreciated that the lever 66' may be coupled to any of various locations along the deck 16'.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A running board assembly for a motor vehicle, said running board assembly comprising:
    a mounting bracket adapted to be fixedly secured to the motor vehicle;
    first and second links each having an upper end pivotal relative to said mounting bracket and an opposing lower end, one of said first and second links including an opening extending therethrough;
    a deck pivotally coupled to said lower end of said first and second links for movement between a stowed position and a deployed position;
    a motor assembly coupled to said mounting bracket; and
    a crank drive operably connected to said motor assembly for pivoting said first and second links to provide controlled movement of said deck between said stowed and deployed positions, said crank drive at least partially housed within said opening in one of said first and second links.

2. A running board assembly as set forth in claim 1 wherein said motor assembly includes a reversible motor.

3. A running board assembly as set forth in claim 2 wherein said motor assembly includes a rotatable drive shaft operably coupled to said reversible motor.

4. A running board assembly as set forth in claim 3 wherein said crank drive includes a crank fixedly mounted to said rotatable drive shaft.

5. A running board assembly as set forth in claim 4 wherein said crank drive includes a lever extending between said crank and one of said first and second links.

6. A running board assembly as set forth in claim 3 wherein said crank drive includes a lever extending between said crank and a portion of said deck.

7. A running board assembly as set forth in claim 6 wherein said deck includes a projection extending out therefrom for coupling to said lever.

* * * * *